A. HENKELL.
Safety-Halter.

No. 200,720.   Patented Feb. 26, 1878.

Witnesses.
Otto Hufeland
Hugo Brueggemann

Inventor.
August Henkell
by
Van Santvoord & Hauff
his attorneys.

N. PETERS, PHOTO-LITHOGRAPHER, WASHINGTON, D C.

UNITED STATES PATENT OFFICE.

AUGUST HENKELL, OF YONKERS, NEW YORK.

IMPROVEMENT IN SAFETY-HALTERS.

Specification forming part of Letters Patent No. 200,720, dated February 26, 1878; application filed January 23, 1878.

*To all whom it may concern:*

Be it known that I, AUGUST HENKELL, of Yonkers, in the county of Westchester and State of New York, have invented a new and Improved Safety-Halter, which invention is fully set forth in the following specification, reference being had to the accompanying drawings, in which—

Figure 1:
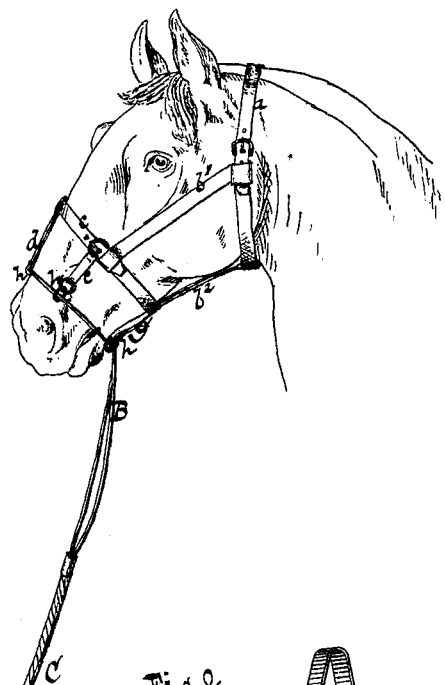
Figure 2:
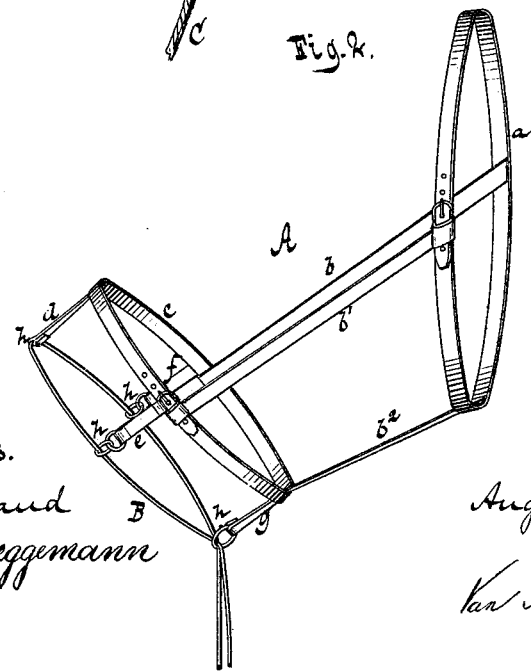

Figure 1 represents my halter in position on a horse. Fig. 2 is a perspective view thereof when removed.

Similar letters indicate corresponding parts.

The object of my invention is to produce a halter which is not liable to be loosened by the horse or other animal; and it consists in a headstall which is provided with looped extensions on the forward part thereof to receive a check-band for encompassing the head of the animal, this band being drawn through said loops of the extensions, and the two ends thereof being arranged to project from one of the loops, so that such ends of the band can be connected to a hitching-strap.

When the check-band is applied to the headstall and fastened to a manger, as stated, a backward movement of the horse has the effect of tightening the band, and by this means the head of the animal is compressed, and his movement is checked.

In the drawing, the letter A designates the headstall of my halter, constructed of a throat-latch, $a$, check-pieces $b$ $b^1$, a chin-strap, $b^2$, and a nose-band, $c$. To the forward part of this headstall—that is to say, to the nose-band $c$—are secured extensions $d$ $e$ $f$ $g$, each of which has a loop, $h$, at its outer end. B is a check-band, which is drawn through the loops $h$ in such a way that its two ends project from the loop of the lowermost extension $g$, as shown. After this check-band B has been put in place, I connect the two ends thereof to a hitching strap or rope, C.

It will be seen that when the hitching-strap C is strained the check-band B is tightened, and thereby that part of the horse's head which is encompassed by the check-band is compressed, the degree of compression being greater or less, according to the amount of strain to which the band is subjected; and hence by the check-band an unruly horse is immediately checked in his attempt to loosen the halter.

I am aware that halters have heretofore been constructed with a slipping nose-strap, which is tightened by the backward pulling of the horse or other animal; but this strap forms an essential part of the headstall, and when enlarged by the slacking of the hitch-strap permits the neck-strap to slip back on the neck, and is itself thus drawn upon on the head, where its tightening is no inconvenience to the animal, and will not restrain it from attempts to break loose. I lay no claim to this form of halter, my invention being an improvement thereon, by which the check or compressing strap is always kept around the mouth and in a position to cause pain by its tightening, so that the animal will not willingly pull upon his hitch-strap. The headstall may be buckled and held in its proper position without respect to the check-strap.

What I claim as new, and desire to secure by Letters Patent, is—

1. A headstall having looped extensions on the forward part thereof to receive a check-band for encompassing the head of a horse or other animal, substantially as shown and described.

2. The combination, in a halter, of a headstall having looped extensions on the forward part thereof, and a check-band which extends through the loops of said extensions, and the two ends of which project from one of the loops, so that such ends of the band can be connected to a hitching-strap, substantially as described.

In testimony that I claim the foregoing I have hereunto set my hand and seal this 19th day of January, 1878.

AUGUST HENKELL. [L. S.]

Witnesses:
JOHN W. ALEXANDER,
T. ASTLEY ATKINS.